(12) United States Patent
Aoi

(10) Patent No.: US 10,094,727 B2
(45) Date of Patent: Oct. 9, 2018

(54) KNOCKING SENSOR

(71) Applicant: NGK SPARK PLUG CO., LTD., Nagoya-shi, Aichi (JP)

(72) Inventor: Katsuki Aoi, Kani (JP)

(73) Assignee: NGK SPARK PLUG CO., LTD., Nagoya (JP)

( * ) Notice: Subject to any disclaimer, the term of this patent is extended or adjusted under 35 U.S.C. 154(b) by 373 days.

(21) Appl. No.: 14/923,561

(22) PCT Filed: May 21, 2014

(86) PCT No.: PCT/JP2014/063479
§ 371 (c)(1),
(2) Date: Oct. 27, 2015

(87) PCT Pub. No.: WO2014/208223
PCT Pub. Date: Dec. 31, 2014

(65) Prior Publication Data
US 2016/0041057 A1  Feb. 11, 2016

(30) Foreign Application Priority Data
Jun. 25, 2013 (JP) .................... 2013-132832

(51) Int. Cl.
*G01L 23/22* (2006.01)
*G01L 19/06* (2006.01)
*G01L 23/26* (2006.01)

(52) U.S. Cl.
CPC ........ *G01L 23/222* (2013.01); *G01L 19/0681* (2013.01); *G01L 23/26* (2013.01)

(58) Field of Classification Search
CPC .............................. G01L 23/222; G01L 23/26
See application file for complete search history.

(56) References Cited

U.S. PATENT DOCUMENTS 4,455,744 A * 6/1984 Zandman ................. H01C 7/06
29/593
4,964,294 A * 10/1990 Kawajiri ............... G01L 23/222
310/329

(Continued)

FOREIGN PATENT DOCUMENTS

CN     1261954 A    8/2000
CN     1359111 A    7/2002
(Continued)

OTHER PUBLICATIONS

State Intellectual Property Office, Office Action issue in corresponding Application No. 201480036813.4, dated Jul. 19, 2017. (English translation unavailable.).

(Continued)

*Primary Examiner* — R. A. Smith
*Assistant Examiner* — John M Royston
(74) *Attorney, Agent, or Firm* — Stites & Harbison, PLLC; Jeffrey A. Haeberlin; James R. Hayne

(57) ABSTRACT

Provided is a knocking sensor with a support member, a piezoelectric element, a pair of electrode parts, a resistor and a case. The resistor has a resistor body formed with a metal film and connected in parallel to the pair of electrode parts. The resistor also has an outer coating film applied to cover the metal film. The outer coating film is formed of a resin material having a higher thermal deformation temperature than that of a resin material of the case.

6 Claims, 4 Drawing Sheets

(56) References Cited

U.S. PATENT DOCUMENTS

| | | | |
|---|---|---|---|
| 6,279,381 B1 | 8/2001 | Brammer et al. | |
| 6,356,333 B1* | 3/2002 | Uchiyama | G02F 1/13452 257/698 |
| 2004/0027233 A1 | 2/2004 | Matsumoto et al. | |
| 2007/0176516 A1 | 8/2007 | Nagaya et al. | |
| 2011/0274831 A1 | 11/2011 | Saegusa et al. | |
| 2014/0076028 A1 | 3/2014 | Kuno et al. | |
| 2014/0096622 A1* | 4/2014 | Kawate | G01L 5/00 73/862.621 |
| 2015/0226618 A1* | 8/2015 | Shih | G01L 1/16 310/329 |

FOREIGN PATENT DOCUMENTS

| | | |
|---|---|---|
| CN | 1605109 A | 4/2005 |
| CN | 1752727 A | 3/2006 |
| CN | 101019012 A | 8/2007 |
| CN | 101724330 A | 6/2010 |
| CN | 102318016 A | 1/2012 |
| CN | 102735394 A | 10/2012 |
| JP | H09-7438 A | 1/1997 |
| JP | H09-021697 A | 1/1997 |
| JP | 3772558 B2 | 5/2006 |
| JP | 2006-300605 A | 11/2006 |
| JP | 4242850 B2 | 3/2009 |
| JP | 4417186 B2 | 2/2010 |
| JP | 2012-237717 A | 12/2012 |

OTHER PUBLICATIONS

International Search Report for International Application No. PCT/JP2014/063479, dated Jul. 15, 2014.

* cited by examiner

KNOCKING SENSOR

CROSS REFERENCE OF RELATED APPLICATION

The present invention claims priority to Japanese Patent Application No. 2013-132832 filed on Jun. 25, 2013, hereby incorporated by reference in its entirety.

FIELD OF THE INVENTION

The present invention relates to a non-resonant knocking sensor for detecting the occurrence of knocking in an internal combustion engine.

BACKGROUND ART

A non-resonant knocking sensor is known, which is fixed to a mounting position on an internal combustion engine by a fixing member such as a bolt for detection of the occurrence of knocking in the internal combustion engine. The knocking sensor has a piezoelectric element as a sensor element and a support member arranged to support the piezoelectric element. An insertion hole is fondled through the center of the support member such that the knocking sensor can be fixed to the mounting position on the internal combustion engine by insertion of the fixing member such as bolt into the through hole.

The knocking sensor also has a pair of electrodes to output a detected knocking signal to an external device. These electrodes are connected to each other by means of a metal film resistor (see, for example, Patent Document 1). Such a metal film resistor is used in various sensors (see, for example, Patent Documents 2 to 4).

PRIOR ART DOCUMENTS

Patent Documents
 Patent Document 1: Japanese Laid-Open Patent Publication No. 2006-300605
 Patent Document 2: Japanese Patent No. 3772558
 Patent Document 3: Japanese Patent No. 4417186
 Patent Document 4: Japanese Laid-Open Patent Publication No. H09-007438

SUMMARY OF THE INVENTION

Problems to be Solved by the Invention

The metal film resistor used in the knocking sensor is of the type having a resistor body fondled with a metal film and covered by an outer coating film of epoxy resin. However, this type of metal film resistor sustains large damage under the application of heat during the formation of a case of the knocking sensor or during the thermal cycle test of the knocking sensor and thus has a problem of heat resistance.

More specifically, the application of high heat causes fusion between the epoxy resin used as the material of the outer coating film of the metal film resistor and nylon-6,6 (hereinafter designated as "nylon 66") as the material of the metal film of the metal film resistor and the case of the knocking sensor. After that, when the outer coating film expands and contracts with changes in external temperature, the fused metal film expands and contracts in synchronization with the outer coating film and thereby becomes separated from the resistor body. Due to such separation of the metal film, the resistance of the metal film resistor deviates from and exceeds its desired value.

In view of the foregoing, one aspect of the present invention is to provide a knocking sensor capable of being improved in heat resistance.

Means for Solving the Problems

According to one aspect of the present invention, there is provided a knocking sensor with a support member, a piezoelectric element, a pair of electrode parts, a resistor and a case. The support member has a cylindrical body portion. The piezoelectric element is formed into an annular shape and disposed around an outer circumference of the body portion of the support member. The pair of electrode parts are arranged around the outer circumference of the body portion of the support member and stacked on the piezoelectric element so as to output an electric signal from the piezoelectric signal to an external device. The resistor has a resistor body formed with a metal film and connected in parallel to the pair of electrode parts. The case is formed of a resin material and located outside the support member so as to surround at least the resistor, the piezoelectric element and the electrode parts. The resistor also has an outer coating film applied to cover the metal film. The outer coating film is formed of a resin material having a higher thermal deformation temperature than that of the resin material of the case.

In the above knocking sensor, the resistor is covered by the outer coating film of e.g. synthetic resin higher in thermal deformation temperature than the resin material of the case. The outer coating film is thus prevented from being fused to the case and the metal film even under the application of heat during the formation of the case of the knocking sensor or during the thermal cycle test of the knocking sensor. It is accordingly possible to reduce the likelihood of separation of the outer coating film from the resistor body and maintain the desired resistance value of the resistor.

In the above knocking sensor, the resistor may be provided with a pair of caps and an inner coating film. The pair of caps are each formed of a metal material with a plating film so as to hold the resistor body and make electrical connections to the respective electrode parts. The inner coating film is applied between the outer coating film and the metal film and formed of a resin material denser in structure than that of the outer coating film.

The heat resistance improvement of the knocking sensor is facilitated by the formation of the inner coating film denser in structure than the outer coating film. In the case where the plating film is applied to the cap of the resistor, there is a possibility that the plating film may be molten by the application of heat to the knocking sensor. When the dense inner coating film is formed between the outer coating film and the metal film, however, the molten plating metal is kept outside the inner coating film. It is thus possible to, as compared to the case where no inner coating film is formed, easily prevent a variation in the resistance value of the resistor caused by contact of the molten plating metal with the metal film.

The inner coating film may be arranged to cover at least edges of contact areas between the metal film and the caps.

The heat resistance improvement of the knocking sensor is more facilitated by the arrangement of the inner coating film over the edges of the contact areas between the metal film and the caps. Even when the plating film of the cap is molten by the application of heat to the knocking sensor, the molten plating metal is generally kept in the same region and solidified at the original position with decrease in sensor temperature. The entry of the molten plating metal from the edge of the contact area is prevented so as to suppress a variation in the resistance value of the resistor. It is thus possible to more easily prevent the resistance value of the resistor from being varied by the action of heat.

In the above knocking sensor, any one of nylon 66, polybutylene terephthalate and polyphenylene sulfide can suitably be used as the resin material of the case; and silicone resin can suitably be used as the resin material of the outer coating film.

When comparing each of nylon 66, polybutylene terephthalate and polyphenylene sulfide with silicone resin, silicone resin is higher in thermal deformation temperature than nylon 66, polybutylene terephthalate and polyphenylene sulfide. For this reason, the use of any of nylon 66, polybutylene terephthalate and polyphenylene sulfide as the resin material of the case and silicone resin as the resin material of the outer coating film of the resistor leads to improvement in the heat resistance of the knocking sensor. As the resistor is covered by the outer coating film of silicone resin higher in thermal deformation temperature than the resin material of the case, the outer coating film is prevented from being fused to the case and the metal film even under the application of heat during the formation of the case from any of nylon 66, polybutylene terephthalate and polyphenylene sulfide or during the thermal cycle test of the knocking sensor. It is thus possible to reduce the likelihood of separation of the outer coating film from the resistor body and maintain the desired resistance value of the resistor.

Effects of the Invention

As mentioned above, the knocking sensor according to the one aspect of the present invention is characterized in that the outer coating film, which covers the resistor, is formed of the resin material higher in thermal deformation temperature than that of the case. This makes it less likely that the outer coating film will be fused to the case even under the application of heat. It is therefore possible to reduce the likelihood of separation of the metal film from the resistor body and maintain the desired the desired resistance value of the resistor so that the knocking sensor is improved in heat resistance.

DESCRIPTION OF REFERENCE NUMERALS

Figure 1:
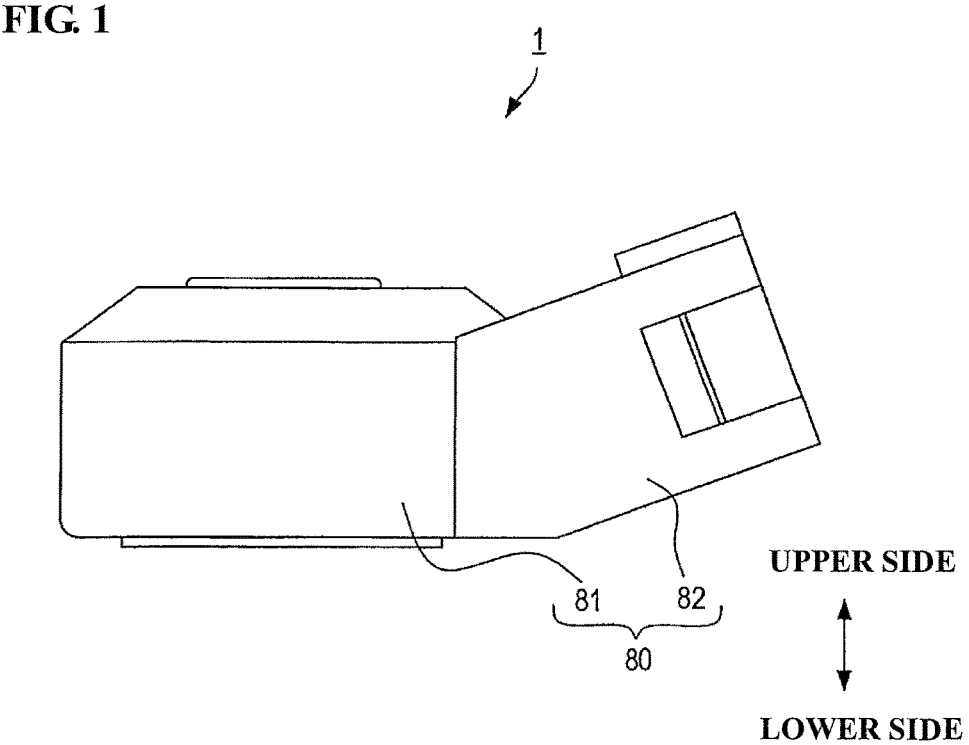
FIG. 1 is a plan view showing the appearance of a knocking sensor according to one exemplary embodiment of the present invention.

1: Knocking sensor
10: Support member
11: Body portion
20: Lower electrode part (Electrode part)
30: Piezoelectric element
40: Upper electrode part (Electrode part)
70: Resistor
71: Resistor body
73: Cap
74: Inner coating film
75: Outer coating film
72: Metal film
80: Case

DESCRIPTION OF EMBODIMENTS

A non-resonant knocking sensor according to one exemplary embodiment of the present invention (hereinafter just referred to as "knocking sensor") will be described below with reference to FIGS. 1 to 4.

In the present embodiment, the knocking sensor 1 is adapted to detect the occurrence of knocking in an internal combustion engine. As shown in FIG. 1, the knocking sensor 1 has various sensor structural components installed within the case 8. The case 8 is formed of an insulating material such as synthetic mold resin. In the present embodiment, the case 80 is of nylon.

Figure 2:
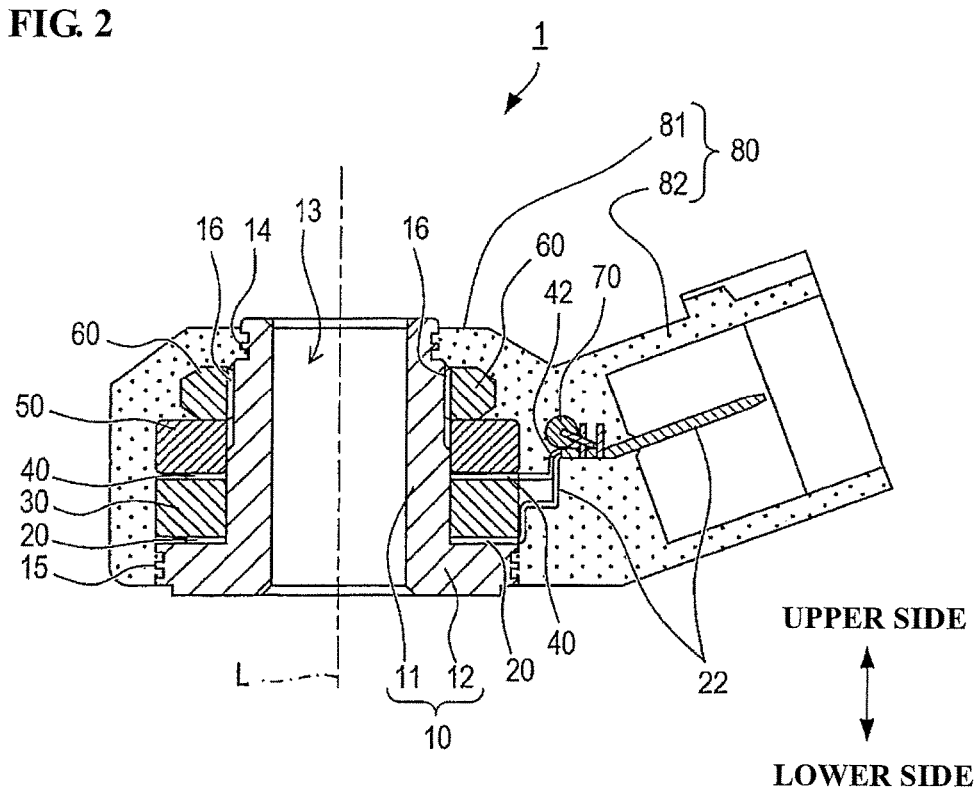
FIG. 2 is a cross-sectional view showing the internal structure of the knocking sensor of FIG. 1.

As shown in FIG. 2, the knocking sensor 1 has a support member 10, a lower electrode part (as an electrode part) 20, a piezoelectric element 30, an upper electrode part (as an electrode part) 40, a weight member 50, a nut 60 and a resistor 70 as the sensor structural components. These sensor structural components are installed within the case 8 as mentioned above.

The case 80 defines the outer shape of the knocking sensor 1 and includes a cylindrical element accommodating portion 81 formed with a tapered upper end (upper side of FIG. 1; the same applies to the following) and a connector portion 82 connected to an external connector for connector to an external device such as ignition timing control device. The connector portion 82 protrudes outwardly from an outer circumferential wall of the element accommodation portion 81.

Figure 3:
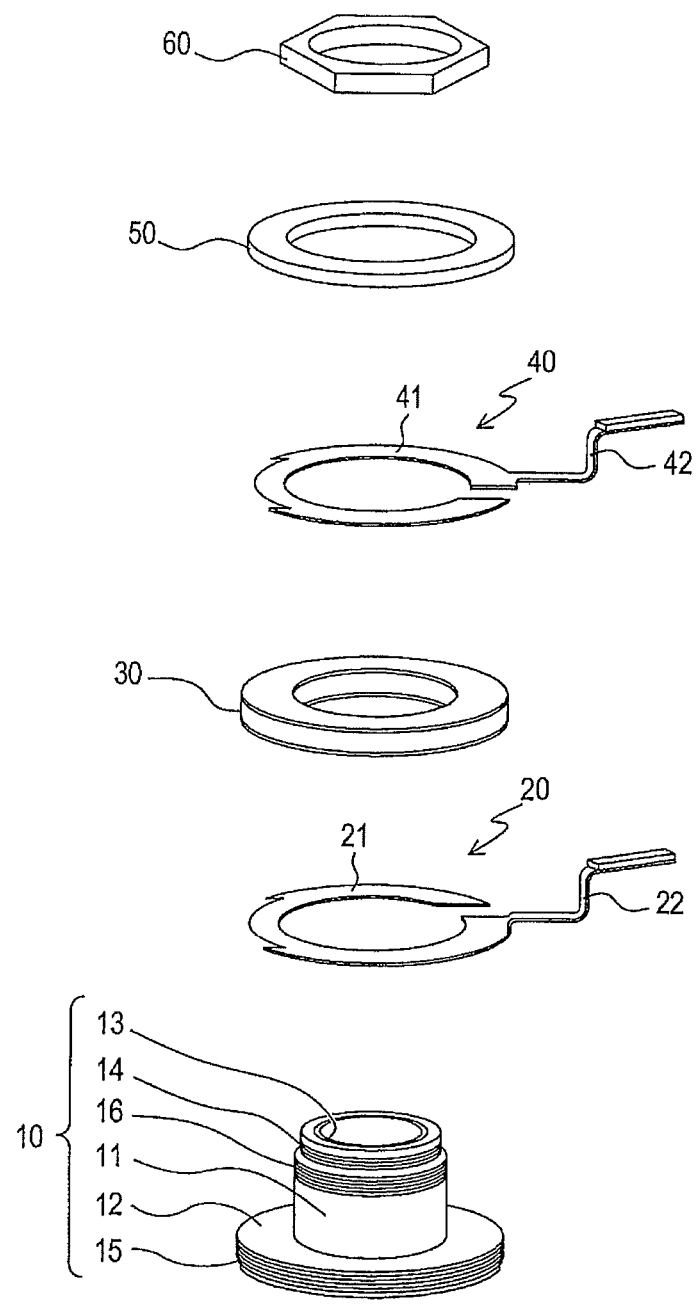
FIG. 3 is an exploded view showing the internal structure of the knocking sensor of FIG. 2.

The support member 10 is formed of iron and includes a body portion 11 and a flanged portion 12 as shown in FIGS. 2 and 3. The body portion 11 of the support member 10 has a cylindrical shape with its center aligned along the direction of an axis L. The flanged portion 12 of the support member 10 protrudes radially outwardly in a ring shape from a lower end of the body portion 11 (lower side of FIGS. 2 and 3).

A through hole 13 is formed through the body portion 11 in the direction of the axis L. A recess 14 is formed in an upper end region of an outer circumferential surface of the body portion 11. A recess 15 is formed in an outer circumferential surface of the flanged portion 12. These recesses 14 and 15 are used for improving the adhesion of the body portion 11 and the case 80. A thread groove 16 is formed in the outer circumferential surface of the body portion 11 at a position lower than the recess 14 such that a nut 60 can be brought into engagement with the thread groove 16.

The lower electrode part 20 includes an annular ring portion 21 and a terminal portion 22 protruding from the ring portion 21. The ring portion 21 surrounds the outer circumference of the body portion 11 while being in contact with a lower surface of the piezoelectric element 30 and thereby being electrically connected to the piezoelectric element 30.

The terminal portion 22 provides an electrical connection from the lower surface of the piezoelectric element 30 (i.e. the ring portion 21) to the connector portion 82 and constitutes an electric signal output path from the lower surface of the piezoelectric element 30. In the present embodiment, the terminal portion 22 is bent upwardly at a predetermined position according to the height of the connector portion 82.

The piezoelectric element 30 is formed of a material having a piezoelectric effect. Examples of such a piezoelectric material are: piezoelectric ceramic materials such as lead zirconate titanate (PZT) and barium titanate; piezoelectric crystal materials such as quartz crystal; and organic piezoelectric materials such as polyvinylidene fluoride. The piezoelectric element 30 is disposed so as to sandwich the lower electrode part 20 between the piezoelectric element 30 and the flanged portion 12. Further, the piezoelectric element 30 is annular in shape and rectangular in section so as to surround the outer circumference of the body portion 11.

The upper electrode part 40 includes an annular ring portion 41 and a terminal portion 42 protruding from the ring portion 41. The ring portion 41 surrounds the outer circumference of the body portion 11 while being in contact with an upper surface of the piezoelectric element 30 and thereby being electrically connected to the piezoelectric element 30.

The terminal portion 42 provides an electrical connection from the upper surface of the piezoelectric element 30 (i.e. the ring portion 41) to the connector portion 82 and constitutes an electric signal output path from the upper surface of the piezoelectric element 30. In the present embodiment, the terminal portion 42 is also bent upwardly at a predetermined position according to the height of the connector portion 82.

The weight member 50 is formed of a metal material such as brass. As in the case of the piezoelectric element 30, the weight member 50 is annular in shape and rectangular in section so as to surround the outer circumference of the body portion 11. Herein, the weight member 50 is used to apply a load to the piezoelectric element 30. The weight member 50 is disposed on the upper side of the piezoelectric element 30 so as to sandwich the upper electrode part 40 between the weight member 50 and the piezoelectric element 30.

The nut 60 is formed with a thread groove for engagement with the thread groove 16 of the body portion 11 and is fixed to the body portion 11 by engaging and rotating the nut (i.e. screwing the nut) onto the thread groove 16. The outer circumference of the nut 60 is shaped into a polygonal form e.g. hexagonal form such that the fixing of the nut 60 can be done by means of a tool adaptable to such a polygonal form.

Figure 4:
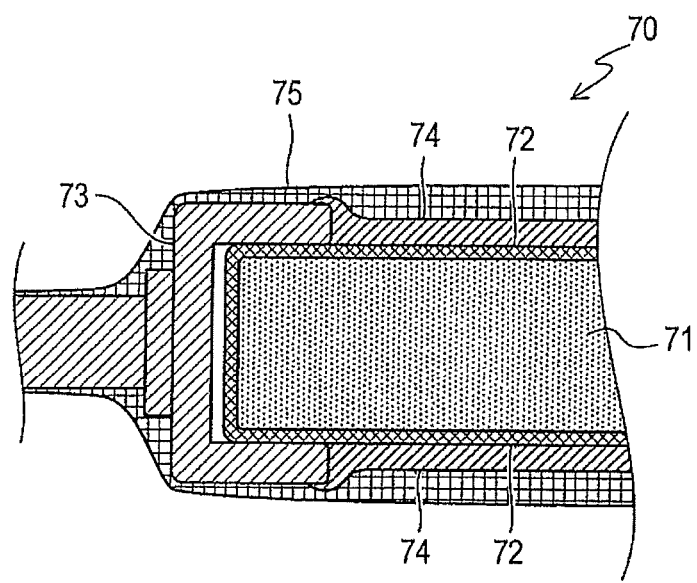
FIG. 4 is a cross-sectional view showing the configuration of a resistor in the knocking sensor of FIG. 2.

The resistor 70, which is the characteristic feature of the present invention, will be explained below. The resistor 70 is in the form of a metal film resistor and is connected in parallel to the upper and lower electrode parts 40 and 20 as shown in FIG. 2. As shown in FIG. 4, the resistor 70 has a resistor body 71 formed with a metal film 72, caps 73 holding the resistor body 71, an inner coating film 74 covering the resistor body 71 and the caps 73 and an outer coating film 75 covering the inner coating film 74.

There is no particular limitation on the configuration of the resistor body 71. The resistor body 71 can be of any known configuration. In the present embodiment, the resistor body 71 is made of a ceramic material and covered by the metal film 72. There is also no particular limitation on the kind of the metal film 72 on the resistor body 71. For example, the metal film 72 can be a film of Ni—Cr (nickel-chromium) alloy or a metal glaze film.

The caps 73 hold the resistor body 71 by sandwiching from both sides and, at the same time, electrically connect the resistor body 71 to the upper and lower electrode parts 40 and 20. In the present embodiment, the caps 73 are each formed by applying a tin plating film to an iron frame.

The inner coating film 74 is formed of epoxy resin and is made denser in structure than the outer coating film 75. The inner coating film 74 is applied to cover the resistor body 71 and the caps 73 and exist at least on the boundaries of contact areas between the metal film 72 of the resistor body 71 and the caps 73, that is, edges of the contact areas.

The outer coating film 75 is formed of silicone resin having a higher thermal deformation temperature than that of nylon 66 as the material of the case 80. The outer coating film 75 is applied to cover the inner coating film 74, the resistor body 71 and the caps 73 and keep these component parts 71, 73 and 74 from contact with the case 80.

Next, the assembling process of the knocking sensor 1 according to the present embodiment will be explained below with reference to FIG. 3.

For assembling of the knocking sensor 1, the lower electrode part 20, the piezoelectric element 30, the upper electrode part 40 and the weight member 50 are first stacked in order of mention from the lower side to the upper side. At this time, the lower electrode part 20, the piezoelectric element 30, the upper electrode part 40 and the weight member 50 are placed so as to surround the outer circumference of the body portion 11 of the support member 10.

In parallel with the above stacking operation, the terminal portion 22 of the lower electrode part 20 and the terminal portion 42 of the upper electrode part 40 are electrically connected to each other via the resistor 70.

The nut 60 is subsequently screwed to the thread groove 16 of the support portion 10 so that the lower electrode part 20, the piezoelectric element 30, the upper electrode part 40 and the weight member 50 are fixed between the flanged portion 12 of the support member 10 and the nut 60.

The subassembly of these sensor structural components is enclosed with an injection molding die. The case 80 is formed by injection molding of nylon 66 in the injection molding die so as to cover the sensor structural components. By this, the knocking sensor 1 is completed.

In the knocking sensor 1, the lower end surface of the flanged portion 12 of the support member 10 is exposed at the lower side of the case 80; and the upper end surface of the body portion 11 of the support member 11 is exposed at the upper side of the case 80. Further, the terminal portions 22 and 42 of the lower and upper electrode parts 20 and 40 are partially exposed within the connector 82.

The knocking sensor 1 is mounted to the internal combustion engine with the lower surface of the knocking sensor 1 (more specifically, the lower end surface of the flanged portion 12 of the support member 10) being held in contact with the optimal site (generally, the mounting portion of a cylinder block) of the internal combustion engine.

In the occurrence of abnormal vibration such as knocking in the internal combustion engine, the abnormal vibration is transmitted to the piezoelectric element 30 through the flanged portion 12 of the support member 10. Then, the piezoelectric element 30 generates an electric signal responsive to the abnormal vibration. The generated electric signal is outputted from the terminal portions 22 and 42 of the lower and upper electrode parts 20 and 40 to the external device.

In the above-structured knocking sensor 1, the resistor 70 is covered by the outer coating film 75 of silicon resin higher in thermal deformation temperature than nylon 66 as the material of the case 80. The outer coating film 75 is thus prevented from being fused to the case 80 even under the application of heat during the formation of the case 80 or during the thermal cycle test of the knocking sensor 1. It is accordingly possible to maintain the desired resistance value of the resistor 70, without causing separation of the metal film 72, and improve the thermal resistance of the knocking sensor 1.

Further, the inner coating film 74 is formed with a denser film structure than that of the outer coating film 75 for facilitation of the heat resistance improvement of the knocking sensor 1. In the case where the tin plating film is applied to the cap 73 of the resistor 70 as in the present embodiment, there is a possibility that the plating film may be molten by the application of heat to the knocking sensor 1. When the dense inner coating film 74 is formed between the outer coating film 75 and the metal film 72, however, the molten plating metal is kept outside the inner coating film 74. It is thus possible to, as compared to the case where no inner coating film 74 is formed, easily prevent a variation in the resistance value of the resistor 70 caused by contact of the molten plating metal with the metal film 72.

Furthermore, the inner coating film 74 is arranged to cover the edges of the contact areas between the metal film 72 of the resistor body 71 and the caps 73 for more facilitation of the heat resistance improvement of the knocking sensor 1. Even when the plating film of the cap 73 is molten by the application of heat to the knocking sensor 1, the molten plating metal is generally kept in the same region and solidified at the original position with decrease in sensor temperature. Thus, the entry of the molten plating metal from the edge of the contact area is prevented so as to suppress a variation in the resistance value of the resistor 70. It is thus possible to more easily prevent the resistance value of the resistor 70 from being varied by the action of heat.

When comparing nylon 66 as the material of the case 80 with silicone resin as the material of the outer coating film 75, the thermal deformation temperature of silicon resin is higher than that of nylon 66. For this reason, the use of any of nylon 66 as the material of the case 80 and silicone resin as the material of the outer coating 75 of the resistor 70 leads to improvement in the heat resistance of the knocking sensor 1. As the resistor 70 is covered by the outer coating film 75 of silicone resin higher in thermal deformation temperature than nylon 66 as the material of the case 80, the outer coating film 75 is prevented from being fused to the metal film 72 and the case 80 even under the application of heat during the formation of the case 80 or during the thermal cycle test of the knocking sensor 1. It is thus possible to reduce the likelihood of separation of the outer coating film 75 from the resistor body 71 and maintain the desired resistance value of the resistor 70.

Although nylon 66 is used as the material of the case 80 in the present embodiment, there is no particular limitation on the material of the case 80. The case 80 may alternatively be formed of polybutylene terephthalate or polyphenylene sulfide.

The present invention is not limited to the above exemplary embodiment. Various changes and modifications of the above embodiments are possible without departing from the scope of the present invention. For example, the structure of the knocking sensor 1 with the resistor 7 is not limited to the above type. It is feasible to apply the resistor 7 to any other type of knocking sensor.

What is claimed is:

1. A knocking sensor, comprising:
    a support member having a cylindrical body portion;
    an annular piezoelectric element disposed around an outer circumference of the body portion of the support member;
    a pair of electrode parts arranged around the outer circumference of the body portion of the support member and stacked on the piezoelectric element so as to output an electric signal from the piezoelectric element to an external device;
    a resistor having a resistor body formed with a metal film and connected in parallel to the electrode parts; and
    a case formed of a resin material and located outside the support member so as to surround at least the resistor, the piezoelectric element and the electrode parts,
    wherein the resistor has an outer coating film applied to cover the metal film; and
    wherein the outer coating film is formed of a resin material having a higher thermal deformation temperature than that of the resin material of the case.

2. The knocking sensor according to claim 1, wherein the resistor has: a pair of caps, each of which is formed of a metal material with a plating film, to hold the resistor body and make electrical connections to the respective electrode parts; and an inner coating film applied between the outer coating film and the metal film and formed of a resin material denser in structure than that of the outer coating film.

3. The knocking sensor according to claim 2, wherein the inner coating film covers at least edges of contact areas between the metal film and the caps.

4. The knocking sensor according to claim 1, wherein the resin material of the case is any one of nylon 66, polybutylene terephthalate and polyphenylene sulfide; and wherein the resin material of the outer coating film is silicone resin.

5. The knocking sensor according to claim 2, wherein the resin material of the case is any one of nylon 66, polybutylene terephthalate and polyphenylene sulfide; and wherein the resin material of the outer coating film is silicone resin.

6. The knocking sensor according to claim 3, wherein the resin material of the case is any one of nylon 66, polybutylene terephthalate and polyphenylene sulfide; and wherein the resin material of the outer coating film is silicone resin.

* * * * *